United States Patent
Beck

(10) Patent No.: US 6,871,845 B2
(45) Date of Patent: Mar. 29, 2005

(54) SELF-PUMPING, HYDROPNEUMATIC SUSPENSION STRUT UNIT

(75) Inventor: Hubert Beck, Eitorf (DE)

(73) Assignee: ZF Sachs AG, Eitorf (DE)

( * ) Notice: Subject to any disclaimer, the term of this patent is extended or adjusted under 35 U.S.C. 154(b) by 40 days.

(21) Appl. No.: 10/439,465

(22) Filed: May 16, 2003

(65) Prior Publication Data

US 2003/0213664 A1 Nov. 20, 2003

(30) Foreign Application Priority Data

Mar. 16, 2002 (DE) .......................................... 102 21 833

(51) Int. Cl.$^7$ .............................................. B60G 17/00
(52) U.S. Cl. ................... 267/64.17; 267/64.26
(58) Field of Search ............... 188/297, 322.13–322.19, 188/315, 269, 298; 267/64.17, 64.26, 64.16, 64.19, 64.23, 64.27, 64.21, 64.24

(56) References Cited

U.S. PATENT DOCUMENTS

| | | | | |
|---|---|---|---|---|
| 5,062,616 | A | * 11/1991 | Sommer ................... | 267/64.17 |
| 5,423,402 | A | * 6/1995 | de Kock ..................... | 188/315 |
| 5,464,079 | A | * 11/1995 | Lohberg et al. ............. | 188/315 |
| 5,826,862 | A | * 10/1998 | Beck ........................ | 267/64.17 |
| 6,494,441 | B2 | * 12/2002 | Beck et al. ............... | 267/64.16 |

* cited by examiner

Primary Examiner—Robert A. Siconolfi
Assistant Examiner—Melanie Torres

(74) Attorney, Agent, or Firm—Cohen, Pontani, Lieberman & Pavane

(57) ABSTRACT

A self-pumping, hydropneumatic suspension strut unit with an internal level control for a vehicle includes a low pressure chamber and a high pressure chamber for storing a damping medium under pressure. The high pressure chamber includes a gas cushion for displacing the damping medium therefrom when the damping medium is under less than a predetermined pressure. A working cylinder has a piston that defines a first volume of the working cylinder in fluid communication with the high pressure chamber. A piston rod is axially displaceable in inward and outward relative to the working cylinder. A pumping rod is axially mounted at one end in the working cylinder and a regulating bore is disposed at a first location of the pumping rod. The bore is closed when the first location is received in the piston rod and places the low pressure chamber in two-way fluid communication with the first volume when the regulating bore is open. A cavity is located axially in the piston rod for receiving the pumping rod and provides a one-way fluid communication from the low pressure chamber to the first volume. A bypass is disposed at a second location on the pumping rod and is closed when the second location is received in the piston rod for placing the cavity in fluid communication with the first volume when the bypass is open. The piston rod is elastically urged in the inward direction so that when the pressures in the low and high pressure chambers are equal, the piston rod and pump rod cooperatively increase the high pressure chamber pressure to the predetermined pressure whereupon the damping medium displaces the piston outward until the regulating bore hole is open to equalize the pressure of the low and high pressure chambers.

8 Claims, 2 Drawing Sheets

SELF-PUMPING, HYDROPNEUMATIC SUSPENSION STRUT UNIT

BACKGROUND OF THE INVENTION

1. Priority Claim

Priority is claimed for this invention and application, a corresponding application having been filed in Germany on May 16, 2002, No. 102 21 833.1-12.

2. Field of the Invention

The invention relates to a self-pumping, hydropneumatic suspension strut unit with an internal level control.

3. Description of the Related Art

Self-pumping hydropneumatic suspension strut units with internal level control intended for use in passenger vehicles are known in the art, for example in DE 198 36 487 A1. A passenger vehicle of this type has a suspension, which typically includes a suspension spring and a shock absorber. When it is desired to use a self-pumping hydropneumatic suspension strut unit, the normal suspension spring is replaced by a weaker suspension spring, since most of the useful load in a passenger vehicle will be carried and controlled by the self-pumping hydropneumatic suspension strut unit.

A suspension strut unit of this type has a pump rod which is mounted in the hollow piston rod and an inlet valve and an outlet valve so that, as a result of relative motion between the body of the vehicle and the vehicle axle, a damping medium is pumped from a low-pressure space into a high-pressure space. These two spaces are partially filled with oil and gas. For diffusion, on the high-pressure side a partition element separates the oil from the gas. When the pump is operating as a result of irregularities in the road surface, the pressure in the high-pressure chamber increases while the pressure in the low-pressure chamber decreases, as a result of which, the piston rod is pushed outward. When the vehicle body reaches the desired level, a bypass insures that the vehicle body will be unable to move any further.

Disadvantageously, suspension strut units are not designed for commercial vehicles (e.g. small delivery trucks, etc.) equipped with leaf-spring suspensions and used to transport heavy useful loads. In such commercial vehicles, the leaf spring not only guides the axle but also absorbs torque, so that reducing the strength of the leaf spring is not an option. A suspension strut unit with self-pumping, hydropneumatic internal level control, however, cannot be used with an unmodified leaf spring because the body of the vehicle would otherwise be raised far too high in the unloaded state.

Thus, it is an object of the present invention to provide a self-pumping, hydropneumatic suspension strut unit with an internal level control such that, without the need to modify the basic design of the suspension already present in the vehicle, even commercial vehicles with leaf spring suspensions designed to transport heavy useful loads can be automatically controlled to remain at predetermined ride height levels.

SUMMARY OF THE INVENTION

This and other objects are met by the present invention, in which the force which is generated by the pump and which moves the piston rod outward is opposed by an elastic force, i.e. a means for an elastic force.

Advantageously, the leaf spring mechanism already present in the vehicle can be retained, so that the chassis can be easily retrofitted for implementing level control.

Since the leaf spring allows the vehicle to travel elastically outward to an extreme distance in the unloaded state, a means for providing an elastic force which opposes outward excursion of the piston rod is included to return the vehicle body back to an appropriate level.

According to one embodiment, of the invention, a compression spring provides an elastic force, or a pneumatic and/or a hydropneumatic spring provides the means for supplying the force. It is advantageous for either a compression spring to be integrated into the suspension strut unit or a pneumatic spring to be housed in another chamber filled with gas and a damping medium. The tensile forces are damped with the assistance of valves, which are installed in a connecting line between the pneumatic spring and the lower working space.

Thus, a simple solution with respect to both design and fabrication is provided by installing a compression spring in such a way that the spring is supported at one end against the suspension strut unit and, at the other end, either directly or indirectly against the piston rod. Advantageously, the spring is located coaxially outside of the suspension strut unit in a chamber created by an appropriate cylindrical extension of the piston rod extending toward the suspension strut unit. The chamber holds the compression spring such that external environmental influences have no effect on the spring.

In accordance with another embodiment, a gas cushion which can be controlled by valves is provided to implement the elastic force.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several figures.

DETAILED DESCRIPTION OF THE PRESENTLY PREFERRED EMBODIMENTS

Figure 1:
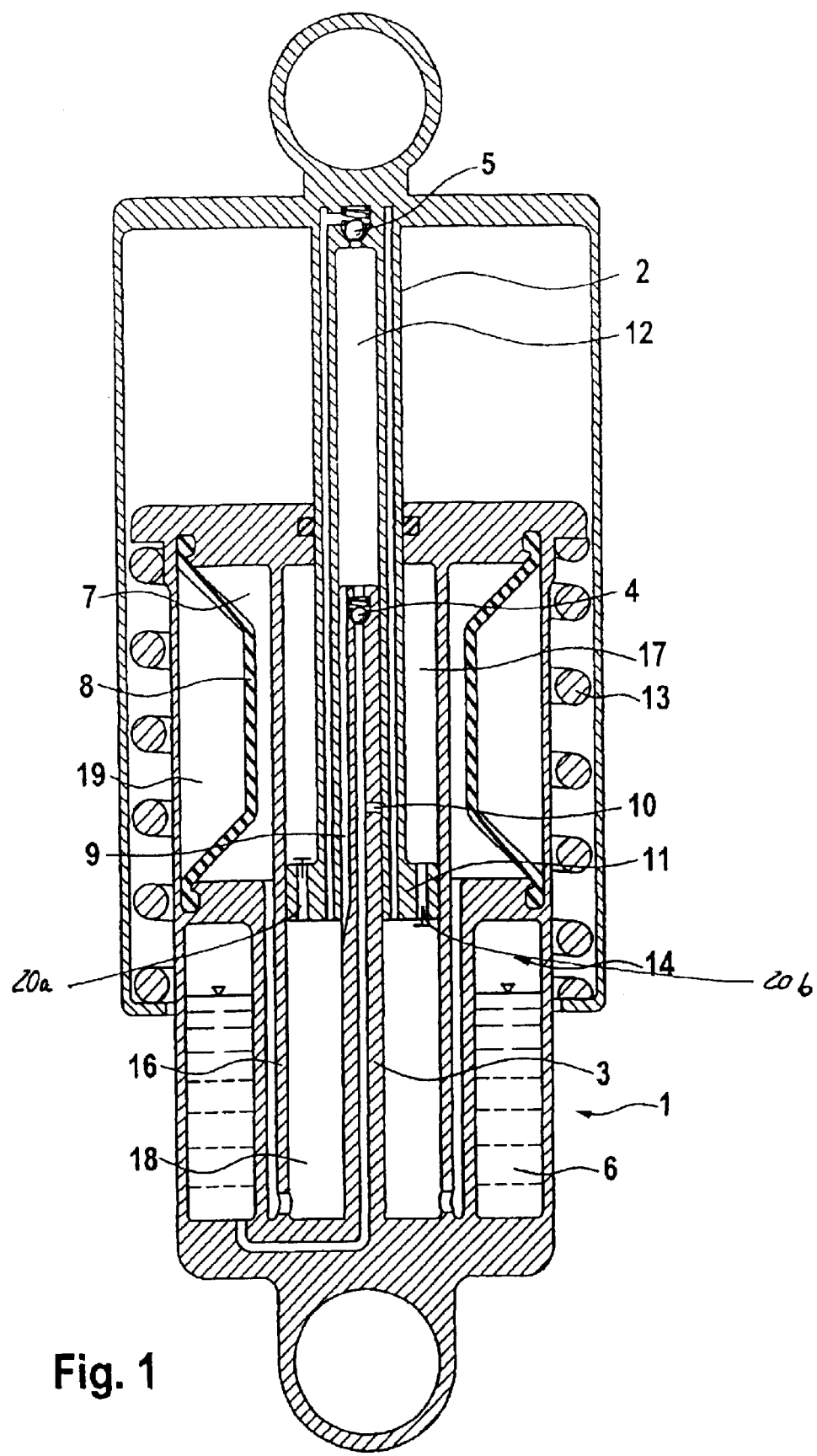
FIG. 1 is a cross-sectional view of a suspension strut unit with a compression spring in accordance with the present invention.

The self-pumping, hydropneumatic suspension strut unit 1 shown in FIG. 1 with internal level control comprises of the working cylinder 16 of the suspension strut unit 1 in which a piston 11, mounted at the end of the piston rod 2, is freely slidable. Working cylinder 16 is closed at one end by a base and at the other end by a cover through which the piston rod 2 emerges to the outside through a seal. The base and the piston rod 2 are each provided with fastening elements (not shown), by which they are attached to the body of the vehicle and to the vehicle axle, respectively.

The working cylinder 16 is connected to a low-pressure chamber 6 and to a high-pressure chamber 7, which are filled partially with oil and partially with gas. Working cylinder 16 is divided by piston 11 into two working spaces 17, 18. Piston 11 itself includes damping valves for the tension and compression stages 20a, 20b.

The level control function of the self-pumping, hydropneumatic suspension strut unit 1 is realized by way of the pump rod 3, which works with the cavity in piston rod 2 to form a pump 12. Thanks to an inlet valve 4 and an outlet valve 5, relative motion between pump rod 3 and piston rod 2 during operation of the vehicle has the effect of conveying damping medium from the low-pressure chamber 6, through inlet valve 4 and outlet valve 5, and into the lower working chamber 18. Piston 11 is pushed outward until a bypass 9 establishes a connection between the chamber of pump 12 and lower working space 18. From this point on, the pumping action is suppressed and a dynamic equilibrium is thus attained. The piston 2 is prevented from traveling beyond the desired range by the regulating bore 10.

High-pressure chamber 7 is separated from a gas cushion 19 by a diaphragm 8.

When the load on the vehicle is removed, piston rod 2 is first pushed further outward by the pretension of the gas in high-pressure chamber 7 until the pressures are equalized inside the suspension strut unit via regulating bore 10, which is now open. Piston rod 2 then is pushed inward together with piston 11.

Compression spring 13 is mounted coaxially outside the suspension strut unit 1; one end of this spring is supported against the upper area of strut unit 1, and the other, lower end of the spring is supported against a projection from an axial extension of piston rod 2. Thus, compression spring 13 exerts a force which urges piston rod 2 inward whereas, in the presence of an uneven road surface, pump 12 of suspension strut unit 1 maintains a force in the lower and upper working spaces 18, 17 a force that seeks to drive piston 11 of the suspension strut unit 1 outward.

Figure 2:
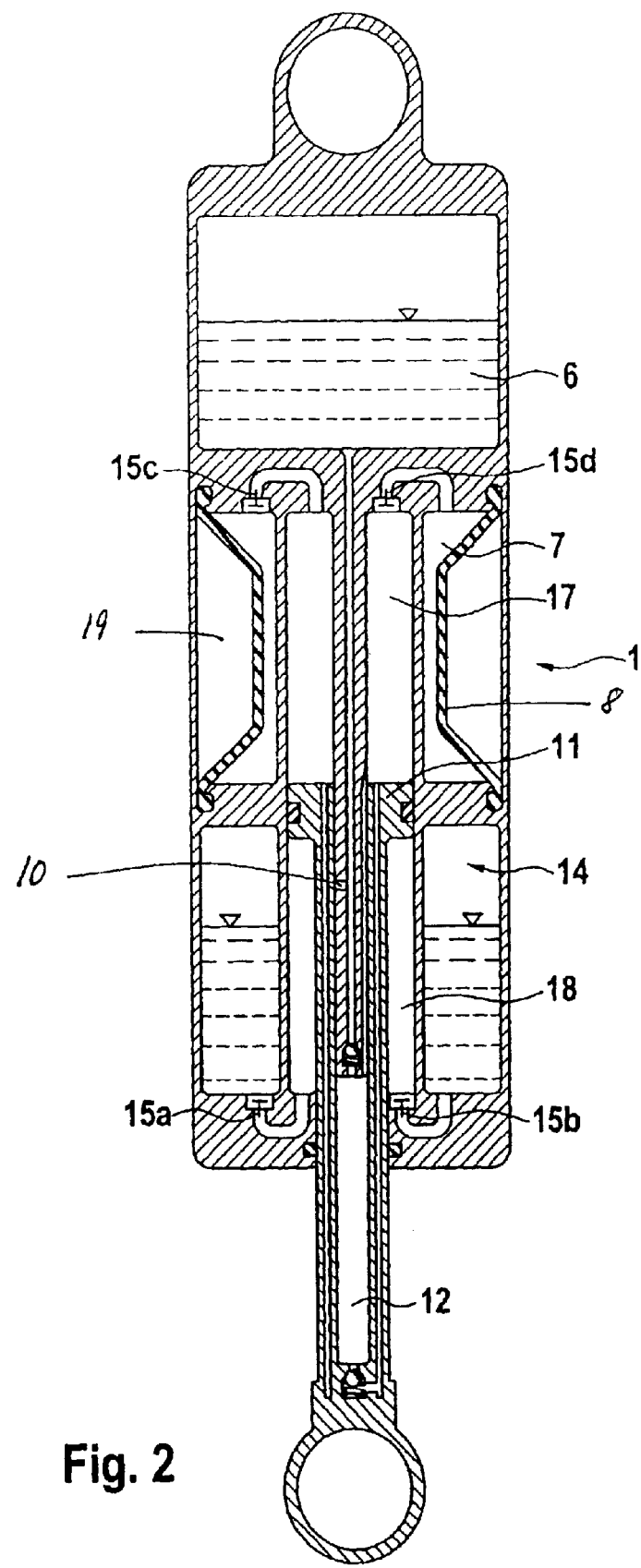
FIG. 2 is a cross-sectional view of a suspension strut unit with a hydropneumatic spring in accordance with the invention.

FIG. 2 shows a suspension strut unit 1 similar to that depicted in FIG. 1, except that a hydropneumatic spring 14 provides the spring, force that exerts pressure on the ring-shaped surface of piston 11 which faces piston rod 2. When piston 11 travels outward, a damping medium is conveyed from low-pressure chamber 6 to pump 12; a valve 15d opens, and the damping medium can then flow from the high-pressure chamber 7 into the upper working space 17. At the same time, outward movement is damped by a valve 15a. When piston 11 travels inward, the damping medium present in pump 12 is forced into the upper working space 17; a valve 15b opens, and a valve 15c then takes over the task of damping the pressure. Independently of the movement of piston 11, pneumatic spring 14 remains permanently connected to the lower working space 18 via the valves 15a, 15b.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping, hydropneumatic suspension strut unit with an internal level control for a vehicle, the strut unit comprising:

a low pressure chamber (6) and a high pressure chamber (7) for storing a damping medium under pressure, the high pressure chamber (7) comprising a gas cushion (19) for displacing the stored damping medium from the high pressure chamber (7) when the damping medium is less than a predetermined pressure;

a working cylinder (16) associated with the low and high pressure chambers (6, 7);

a piston (11) sealed in the working cylinder (16) so as to define a first volume (18) of the working cylinder (16) in fluid communication with the high pressure chamber (7);

a piston rod (2) connected to the piston (11) and axially displaceable in an inward direction and an outward direction relative to the working cylinder (16);

a pumping rod (3) axially mounted at one end of the working cylinder (16);

a regulating bore (10) disposed on the pumping rod (3) at a first location of the pumping rod (3) so that the regulating bore (10) is closed when the first location is received in the piston rod (2) and so that; the regulating bore (10) places the low pressure chamber (6) in two-way fluid communication with the first volume (18) when the regulating bore (10) is open;

a cavity (12) defined axially in the piston rod (2) for receiving the pumping rod (3) and providing a one-way fluid communication path from the low pressure chamber (6) to the first volume (18), a bypass (9) associated with the cavity (12) and defined at a second location on the pumping rod (3) so as to be closed when the second location is received in the piston rod (2), the second location being disposed more proximate to an end of the piston rod (2) mounted in the working cylinder (16) than the first location and the bypass (9) being disposed for placing the cavity (12) in additional fluid communication with the first volume (18) when the bypass (9) is open; and means for producing an elastic force for urging the piston rod (2) in the inward direction;

wherein when pressures in the low pressure chamber (6) and in the high pressure chamber (7) are equal, the means for producing an elastic force displaces the piston rod (2) in the inward direction so that the piston rod (2) and the pump rod (3) cooperate to increase the pressure in the high pressure chamber (7) to the predetermined pressure whereupon the damping medium displaces the piston rod (2) in the outward direction until the regulating bore hole (10) is open so that the pressure between the low pressure chamber (6) and the high pressure chamber (7) is equalized.

2. The strut unit of claim 1, wherein the means for producing an elastic force comprises a compression spring (13).

3. The strut unit of claim 1, wherein the means for producing an elastic force comprises a pneumatic spring (14).

4. The strut unit of claim 1, wherein the means for producing an elastic force comprises a hydropneumatic spring (14).

5. The strut unit of claim 2, wherein the compression spring (13) is disposed so that it is supported at one end by the working cylinder (16) and at its other end by the piston rod (2).

6. The strut unit of claim 5, wherein the compression spring (13) is located coaxially outside the working cylinder (16).

7. The strut unit of claim 3, wherein a gas cushion (19) controllable by valves (15) provides a return force.

8. A suspension unit for mounting on a vehicle, the suspension unit comprising a first anchor for connection to a body of the vehicle; a second anchor for connection to a wheel of the vehicle; and a strut disposed between the first and second anchors, said strut comprising:

a low pressure chamber (6) and a high pressure chamber (7) for storing a damping medium under pressure, the high pressure chamber (7) comprising a gas cushion (19) for displacing the stored damping medium from the high pressure chamber (7) when the damping medium is less than a predetermined pressure;

a working cylinder (16) associated with the low and high pressure chambers (6, 7);

a piston (11) sealed in the working cylinder (16) so as to define a first volume (18) of the working cylinder (16) in fluid communication with the high pressure chamber (7);

a piston rod (2) connected to the piston (11) and axially displaceable in an inward direction and an outward direction relative to the working cylinder (16);

a pumping rod (3) axially mounted at one end of the working cylinder (16);

a regulating bore (10) disposed on the pumping rod (3) at a first location of the pumping rod (3) so that the regulating bore (10) is closed when the first location is received in the piston rod (2) and so that the regulating bore (10) places the low pressure chamber (6) in two-way fluid communication with the first volume (18) when the regulating bore (10) is open;

a cavity (12) defined axially in the piston rod (2) for receiving the pumping rod (3) and providing a one-way fluid communication path from the low pressure chamber (6) to the first volume (18), a bypass (9) associated with the cavity (12) and defined at a second location on the pumping rod (3) so as to be closed when the second location is received in the piston rod (2), the second location being disposed more proximate to an end of the piston rod (2) mounted in the working cylinder (16) than the first location and the bypass (9) being disposed for placing the cavity (12) in additional fluid communication with the first volume (18) when the bypass (9) is open; and means for producing an elastic force for urging the piston rod (2) in the inward direction;

wherein when pressures in the low pressure chamber (6) and in the high pressure chamber (7) are equal, the means for producing an elastic force displaces the piston rod (2) in the inward direction so that the piston rod (2) and the pump rod (3) cooperate to increase the pressure in the high pressure chamber (7) to the predetermined pressure whereupon the damping medium displaces the piston rod (2) in the outward direction until the regulating bore hole (10) is open so that the pressure between the low pressure chamber (6) and the high pressure chamber (7) is equalized.

* * * * *

UNITED STATES PATENT AND TRADEMARK OFFICE
CERTIFICATE OF CORRECTION

PATENT NO.   : 6,871,845 B2
DATED        : March 29, 2005
INVENTOR(S)  : Hubert Beck It is certified that error appears in the above-identified patent and that said Letters Patent is hereby corrected as shown below:

<u>Title page,</u>
Item [30], Foreign Application Priority Data, should read:
-- May 16, 2002      (DE)      102 21 833 --.

Signed and Sealed this

Eighth Day of November, 2005

JON W. DUDAS
*Director of the United States Patent and Trademark Office*